United States Patent [19]
Chiba et al.

[11] 3,951,662
[45] Apr. 20, 1976

[54] METHOD OF ANTISTATIC TREATMENT FOR SILVER HALIDE PHOTOSENSITIVE MATERIALS

[75] Inventors: Norio Chiba, Hachioji; Masao Ishihara, Hino; Sadatsugu Terada, Hachioji; Koichi Horigome, Tokyo; Kyusaku Yoshida, Hachioji; Kenichi Taguchi, Sayama; Mitate Matsui, Hachioji, all of Japan

[73] Assignee: Konishiroku Photo Industry Co., Ltd., Tokyo, Japan

[22] Filed: Nov. 15, 1973

[21] Appl. No.: 416,184

[30] Foreign Application Priority Data
Nov. 20, 1972 Japan............................ 47-115641

[52] U.S. Cl.................................. 96/84 R; 96/67; 96/87 A; 96/114.2; 96/114

[51] Int. Cl.².......................................... G03C 1/82
[58] Field of Search.................. 96/87 A, 67, 114.2, 96/84 R

[56] References Cited
UNITED STATES PATENTS

| | | | |
|---|---|---|---|
| 3,551,152 | 12/1970 | MacKey et al. | 96/87 A |
| 3,704,128 | 11/1972 | Koda et al. | 96/50 |
| 3,850,641 | 11/1974 | Horigome et al. | 96/87 A |

*Primary Examiner*—Ronald H. Smith
*Attorney, Agent, or Firm*—Jordan B. Bierman; Linda Bierman; Kenneth J. Stempler

[57] ABSTRACT

Supported silver halide photosensitive materials comprising an antistatic additive which comprises a glycidol poly-addition product of a phenol-aldehyde condensate.

4 Claims, No Drawings

METHOD OF ANTISTATIC TREATMENT FOR SILVER HALIDE PHOTOSENSITIVE MATERIALS

This invention relates to a method of antistatic treatment for silver halide photosensitive materials.

Many troubles are caused to occur by static charges during the steps of manufacturing silver halide photosensitive materials. Most of materials used as substrates of silver halide photosensitive materials are hydrophobic and they are readily statically charged. Accordingly, they are statically charged during various manufacturing steps such as winding and rewinding steps, the step of coating various layers such as a photosensitive layer and the transferring step in the drying zone by frictional contacts with other substances and peeling off from other substances, and when static charges are discharged, the silver halide photosensitive material coated on the photosensitive layer changes as same as in the case of exposure to light and marks owing to this phenomenon caused by such static charges, namely so called static marks, appear after development. Further, in processing and using steps of photosensitive materials, static charges are accumulated and dusts are attracted to and attached on the materials. These attached dusts cause to occur some defects.

Occurence of static marks is frequent as the sensitivity of a silver halide photosensitive material is high. Further, with recent tendency of high sensitization of silver halide photosensitive materials and increase of chances of severe mechanical treatments such as by high speed automatic operation, occurrence of static marks tends to increase.

Many substances have heretofore been used as antistatic agents for silver halide photosensitive materials. In general, these substances have moisture-absorbing property, and they give electric conductivity to silver halide photosensitive materials to thereby prevent accumulation of static charges.

However, most of these known antistatic substances do not exhibit satisfactory antistatic effects to highly sensitive silver halide photosensitive materials, especially at low humidity, and their antistatic effects are degraded with the lapse of time and the photosensitive materials treated by the known antistatic agent are apt to stick at a high temperature. Accordingly, most of known antistatic agents are not suitable for silver halide photosensitive materials. Many other compounds are known as antistatic agents, but since it is required that no bad influences are imposed on photographic characteristics of silver halide photosensitive materials such as photosensitivity, gradient, fog and storage stability, it is very difficult to fine out an excellent antistatic agent suitable for silver halide photosensitive materials.

As a result of our research words made with a view to developing excellent antistatic agents for silver halide photosensitive materials which do no harm on photographic characteristics of them, we have found that glycidol polyaddition products of phenolaldehyde condensates and glycidol polyaddition products of halogen-treated phenol-formalin condensates are excellent as antistatic agents for silver halide photosensitive materials.

Silver halide photosensitive materials in which occurrence of static troubles is much reduced can be obtained by incorporating the above glycidol polyaddition product into at least one constituent layer of a photosensitive material such as undercoat, intermediate, filter, antihalation, protective and backing layers or coating the above glycidol polyaddition product on the outermost layer of a silver halide photosensitive material. Use of this glycidol polyaddition product has no bad influences on any of photographic characteristics of silver halide photosensitive materials such as sensitivity, gradient and fog. Further, since the wettability to photographic treating liquors is improved in a silver halide photosensitive material incorporated with this glycidol polyaddition product, there is brought about another advantage that uneven development is not caused.

The glycidol polyaddition product of a phenolaldehyde condensate to be used in this invention is obtained by addition polymerizing glycidol with an optionally substituted phenol-aldehyde condensate having the following recurring units represented by general formula (I)

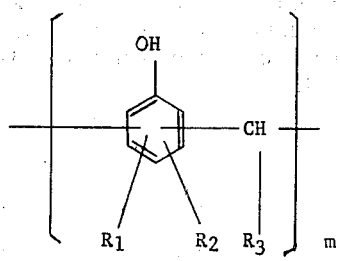

(wherein $R_1$ and $R_2$ stand for a hydrogen or halogen atom or a carboxyl, acyl, alkoxycarbonyl, alkyl, substituted alkyl, alkoxy or phenyl group, $R_3$ designates a hydrogen atom or a methyl or -furyl group, and $m$ indicates the degree of polymerization.)

As examples of such optionally substituted phenol-aldehyde resin, there can be mentioned the following resins:

Phenol-formalin resin, 4-methylphenol-formalin resin, 2-tert-butylphenol-formalin resin, 4-tert-butylphenol-formalin resin, 4-octylphenol-formalin resin, 4-nonylphenol-formalin resin, 2,4-di-nonylphenol-formalin resin, 4-dodecylphenol-formalin resin, 4-tetradecylphenol-formalin resin, 2-octadecylphenol-formalin resin, 4-octadecylphenol-formalin resin, 3-pentadecylphenol-formalin resin, 2,4-di-tertbutylphenol-formalin resin, 2-methyl-4-tetradecylphenol-formalin resin, 2-chlorophenol-formalin resin, 4-bromophenol-formalin resin, 3-nitrophenol-formalin resin, 4-carboxyphenol-formalin resin, 2-chloro-4-hydroxyethylphenol-formalin resin, 2-chloro-4-chloroethylphenol-formalin resin, 2-iodoethyl-4-methoxycarbonylphenol-formalin resin, 4-methoxyphenol-formalin resin, 4-methylcarboxyphenol-formalin resin, 2-hydroxymethyl-3-methylphenol-formalin resin, 4-nonylphenol/2,4-di-nonylphenol-formalin resin, phenol-acetaldehyde resin, 4-methylphenol-acetaldehyde resin, 4-tert-butylphenol-acetaldehyde resin, 2-octylphenolacetaldehyde resin, 4-nonylphenol-acetaldehyde resin, 3-pentadecylphenol-acetaldehyde resin, 2,4-di-tert-butylphenol-acetaldehyde resin, 2-methyl-4-tetradecylphenol-acetaldehyde resin, 4-chlorophenol-acetaldehyde resin, 2-bromophenol-acetaldehyde resin, 2-chloroethyl-4-chlorophenol-acetaldehyde resin, 2-iodomethyl-4-methoxycarbonylphenol-acetaldehyde resin, 2-methylcarboxyphenolacetaldehyde resin, 4-nonylphenol/2,4-di-nonylphenol-acetaldehyde resin, 4-tetradecylphenol-acetaldehyde resin, 2-octadecyl-phenolacetaldehyde resin, 4-octadecylphenol-acetaldehyde resin, 4-tert-4-methoxyphenolacetaldehyde resin, 4-tert-butylphenol-furfural resin, 2,4,-di-nonylpheol-furfural resin, 4-dodecylphenol-furfural resin, 4-carboxylphenol-furfural resin, 2-chloro-4-hydroxyethylphenol-furfural resin, 2-hydroxymethyl-3-methylphenol-furfural resin, 4-nonylphenol/2,4-di-nonylphenol-furfural resin, etc.

These phenol-aldehyde condensates are generally prepared by condensing phenols with aldehydes. For instance, in the case of a phenol-acetaldehyde resin, there can be obtained resins having the same recurring units as represented by general formula (I) by employing acetylene as the starting material instead of acetaldehyde. Any of these resis can be used effectively as the starting material to which glycidol is added regardless of the resin manufacturing process.

Glycidol polyaddition products of halogen-treated phenol-formalin condensates are obtained by treating optionally substituted phenol-formalin resins having recurring units such as represented by following general formula (II)

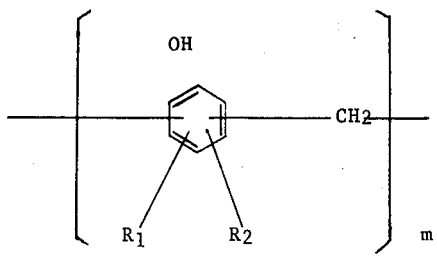

(wherein $R_1$ and $R_2$ stand for a hydrogen or halogen atom, or a carboxyl, acyl, alkoxycarbonyl, alkyl substituted alkyl, alkoxy or phenyl group, and $m$ designates the degree of polymerization,) with a hydrogen halide to convert methylol groups left at terminal ends of the condensate to halogenated methyl groups, and polyadding glycidol to the resulting halogen-treated products.

As haloganated products of substituted or unsubsstituted phenol-formalin condensates there can be mentioned, for example, the following resins:

Brominated phenol-formalin resin, brominated 4-methylphenol-formalin resin, chlorinated 2-tert-butyl-phenol-formalin resin, chlorinated 4-tert-butylphenol-formalin resin, brominated 4-octylphenol-formalin resin, chlorinated 4-cumylphenol-formalin resin, brominated 4-nonylphenol-formalin resin, chlorinated 2,4-di-nonylphenol-formalin resin, chlorinated 4-tertradecylphenol-formalin resin, brominated 2-octadecylphenol-formalin resin, chlorinated 2,4-di-tert-butylphenol-formalin resin, brominated 2-methyl-4-tetradecylphenol-formalin resin, chlorinated 2-chlorophenol-formalin resin, brominated 4-bromo-phenol-formalin, chlorinated 2-chloro-4-hydroxyethyl-phenol-formalin resin, brominated 4-methoxyphenol-formalin resin, etc.

The glycidol polyaddition products of a phenol-aldehyde resin and of a halogen-treated phenol-formalin resin to be used in this invention can be prepared by dissolving one or more of the foregoing phenol-aldehyde and halogenated phenol formalin resins in an organic solvent such as toluene, xylene and dioxane, adding glycidol dropwise to the resulting solution under aditation at 130° to 140° C. over a period of about 5 hours in the presence of an alkali catalyst such as potassium hydroxide to cause addition polymerization, and removing the solvent from the reaction mixture under reduced pressure. The so obtained glycidol polyaddition products are generally viscous or waxy, and are soluble in water or an organic solvent such as methanol, ethanol, acetone, dioxane, methyl cellosolve and dimethylformamide.

It is preferred that the amount of polyadded of glycidol is within about 50 moles on the average per the principal structural unit of the phenol-aldehyde or halogenated phenol-formalin condensate. If a polyaddition product obtained by polyadding glycidol in an amount larger than the above range is used in a silver halide photosensitive emulsion layer or a layer adjacent thereto, fogs are given to the photosensitive emulsion and the developing characteristics are degraded when development is conducted with hydroquinone at high temperatures. Therefore, use of the glycidol polyaddition product in such a large amount is not preferred.

Typical instances of the glycidol polyaddition products of phenol-aldehyde condensates and of halogenated phenol-formalin condensates are as follows:

Compound No. 1:
glycidol polyaddition product of 4-nonylphenol-formalin resin (3 moles on the average added per principal structural unit of the resin Compound No. 2:
glycidol polyaddition product of 4-tert-butyl-phenol-formalin resin (10 mols on the average added per principal structural unit of the resin)

Compound No. 3:
glycidol polyaddition product of 4-dodecylphenol-formalin resin (30 moles on the average added per principal structure of the resin)

Compound No. 4:
glycidol polyaddition product of 2-tert-octylphenol-formalin resin (20 moles on the average added per principal structure unit of the resin)

Compound No. 5:
glycidol polyaddition product of 4-methylphenol-formalin resin (3 moles on the average added per principal structural unit of the resin)

Compound No. 6:
glycidol polyaddition product of 2-butylphenol-formalin resin (3 moles on the average added per principal structural unit of the resin)

Compound No. 7:
glycidol polyaddition product of 4-nonylphenol/2,4-di-nonylphenol-formalin resin (1/1 mole ratio) (30 moles on the average added per principal structural unit of the resin)

Compound No. 8:
glycidol polyaddition product of phenol-formalin resin (15 moles on the average added per principal structural unit of the resin)

Compound No. 9:
glycidol polyaddition product of 4-methylphenol/4-tertbutylphenol-formalin resin (5/2 mole ratio) (10 moles on the average added per principal structural unit of the resin)

Compound No. 10:
glycidol polyaddition product of 4-nonylphenol-formalin resin (5 moles on the average added per principal structural unit of the resin)

Compound No. 11:

glycidol polyaddition product of 2-chlorophenol-formalin resin (5 moles on the average added per principal structural unit of the resin)

Compound No. 12:
glycidol polyaddition product of 4-nitrophenol-formalin resin (15 moles on the average added per principal structural unit of the resin)

Compound No. 13:
glycidol polyaddition product of 2-chloro-4-hydroxyethylphenol/4-methylearboxyphenol-formalin resin (1/20 mole ratio) (10 moles on the average added per principal structural unit of the resin)

Compound No. 14:
glycidol polyaddition product of 4-methoxycarbonylphenol-formalin resin (20 moles on the average added per principal structural unit of the resin)

Compound No. 15:
glycidol polyaddition product of 4-methoxyphenol-formalin resin (50 moles on the average added to principal structural unit of the resin)

Compound No. 16:
glycidol polyaddition product of 3-nitrophenol-formalin resin (40 moles on the average added per principal structural unit of the resin)

Compound No. 17:
glycidol polyaddition product of phenol-acetaldehyde resin (10 moles on the average added per principal structural unit)

Compound No. 18:
glycidol polyaddition product of 4-nonylphenol-acetaldehyde resin (15 moles on the average added per principal structural of the resin)

Compound No. 19:
glycidol polyaddition product of 2-tert-octylphenol-acetaldehyde resin (10 moles on the average added per structural unit of the resin)

Compound No. 20:
glycidol polyaddition product of 4-tert-butylphenol-acetaldehyde resin (10 moles on the average added per principal structural unit of the resin)

Compound No. 21:
glycidol polyaddition product of 4-methylphenol-acetaldehyde resin (5 moles on the average added per principal structural unit of the resin)

Compound No. 22:
glycidol polyaddition product of 2-butylphenol-acetaldehyde resin (10 moles on the average added per principal structural unit of the resin)

Compound No. 23:
glycidol polyaddition product of 2-chlorophenol-acetaldehyde resin (5 moles on the average added per principal structural unit of the resin)

Compound No. 24:
glycidol polyaddition product of 4-nonylphenol-acetaldehyde resin (3 moles on the average per principal structural unit of the resin)

Compound No. 25:
glycidol polyaddition product of 2-chloro-4-hydroxymethylphenol/4-methylcarboxyphenol-acetaldehyde resin (⅛ mole ratio) (10 moles on the average added per principal structural unit of the resin)

Compound No. 26:
glycidol polyaddition product of 4-nonylphenol/2,4-di-nonylphenol-acetaldehyde resin (½ more ratio) (20 moles on the average added per principal structural unit of the resin)

Compound No. 27:
glycidol polyaddition product of 4-dodecylphenol-furfural resin (20 moles on the average added per principal structural unit of the resin)

Compound No. 28:
glycidol polyaddition product of 4-methoxycarbonylphenol-furfural resin (10 moles on the average added per principal structural unit of the resin)

Compound No. 29:
glycidol polyaddition product of 4-methoxyphenol-furfural resin (50 moles on the average added per principal structural unit of the resin)

Compound No. 30:
glycidol polyaddition product of 4-ethylphenol/4-tertbutylphenol-furfural resin (4/3 mole ratio) (10 moles on the average added per principal structural unit of the resin)

Compound No. 31:
glycidol polyaddition product of brominated 4-tert-butylphenol-formalin resin (3 moles on the average added per principal structural unit of the resin)

Compound No. 32:
glycidol polyaddition product of brominate 4-nonylphenolformalin resin (5 moles on the average added per principal structural unit of the resin)

Compound No. 33:
glycidol polyaddition product of chlorinated 4-phenylphenol-formalin resin (5 moles on the average added per principal structural unit of the resin)

Compound No. 34:
glycidol polyaddition product of brominated phenol-formalin resin (4 moles on the average added per principal structural unit of the resin)

Compound No. 35:
glycidol polyaddition product of chlorinated 4-cumylphenol-formalin resin (5 moles on the average added per principal structural unit of the resin)

Compound No. 36:
glycidol polyaddition product of brominated 4-octylphenol-formalin resin (5 moles on the average added per principal structural unit of the resin)

Compound No. 37:
glycidol polyaddition product of chlorinated 4-carboxyphenol-formalin resin (2 moles on the average added per principal structural unit of the resin)

Compound No. 38:
glycidol polyaddition product of brominated 4-acetylphenol-formalin resin (8 moles on the average added per principal structural unit of the resin)

When the above-mentioned glycidol polyaddition product of a phenol-aldehyde condensate or a halogenated phenol-formalin condensate is applied to a silver halide photographic photosensitive material, it exhibits an excellent antistatic effect without imposing bad influences on the photographic characteristics of the photosensitive material. Especially in the case of glycidol polyaddition products of halogenated phenol-formalin resins, the antistatic activity is hardly reduced with the lapse of time or a high temperature under and they are especially excellent antistatic agents.

Incorporation of the glycidol polyaddition product of a phenol-aldehyde resin or an halogenated phenol-formalin resin into a structural layer of a silver halide photosensitive material, such as silver halide emulsion, undercoat, intermediate, filter, anti-halation, protective and backing layers, can be accomplished by dissolving the glycidol polyaddition product in a coating solution for formation of such layer or by dissolving the glycidol polyaddition product into one or more of organic solvents such as methanol, ethanol, acetone, dioxane, methyl cellosolve and dimethylformamide and adding the solution to a coating solution for formation of such layer. In case the glycidol polyaddition product is coated on the surface of a substrate or an outermost layer of a silver halide photosensitive material, a solution of the glycidol polyaddition product in such a solvent as mentioned above is spray-coated on such surface or the substrate or silver halide photosensitive material is immersed in the above solution. When the water solubility of the glycidol polyaddition product is low, a suitable surfactant, for example, an anionic surfactant, is used in combination, or the glycidol polyaddition product is dissolved in a solvent and the solution is dispersed in water by means of a colloid mill, a ultrasonic dispersing machine or the like. The resulting solution is added to a layer of the silver halide photosensitive material or applied to the outermost layer thereof.

In case the glycidol polyaddition product of this invention is applied to a layer of the silver halide photosensitive material, the amount of the glycidol polyaddition product is changed depending on the kind of the polyaddition product and the area to which it is applied, but in general, a good antistatic effect can be obtained by making the polyaddition product present in an amount of $5 \times 10^{-1}$ to $1 \times 10^{-3}$ mole per square meter of the photosensitive material. However, the amount applied of the polyaddition product is not limited within this range, and an optimum amount giving the best results can be optionally chosen.

As silver halide photosensitive materials to which this invention is effectively applied, there are mentioned, for instance, ordinary photosensitive materials for monochromatic photography, photosensitive materials for color photography, photographic materials for printing, photosensitive materials for X-ray photography, and the like. Further, kinds of substrates and finders and additives to be used for various constituent elements of these photosensitive materials such as substrates, silver halide photosensitive emulsions and other layer-forming substances are not limited owing to the glycidol polyaddition product and any of these constituents can be used effectively in this invention. For instance, polyethylene terephthalate, polycarbonate, polystyrene, polyethylene, polypropylene, cellulose acetate and the like be used as substrates, and gelation, polyvinyl alcohol, cellulose acetate, cellulose acetate phthalate and the like can be used as binders.

The glycidol polyaddition product of this invention can be used in combination with another antistatic agents such as ethylene oxide addition product of phenol-aldehyde condensates and nitrogen-containing quaternary salt compounds. Especially good antistatic results can be obtained by using the glycidol polyaddition product of this invention in combination with ethylene oxide addition polymer of phenol-aldehyde resins.

This invention will now be illustrated by reference to Examples, but embodiments of this invention are not limited to those shown in these Examples.

EXAMPLE 1

Gold sensitization was conducted at the step of the second aging of a highly sensitive, silver iodobromide gelatin emulsion containing 1.5 mole % of silver iodide, and a stabilizer, a sensitizer, a film-hardening agent, a coating agent and other additives were added to the emulsion. Then, the resulting liquid mixture was coated and dried on a polyethylene terephthalate film.

A gelatin solution incorporated with a film-hardening agent and a coating agent was prepared and the solution was divided into 6 portions. Compounds Nos. 10, 15, 17, 19 and 36 were added as antistatic agents to 5 divided portions of the solution, respectively, in an amount of 3 g per liter of the solution. These sample solutions and one remaining portion free of the antistatic agent were coated respectively on the above silver iodo-bromide emulsion as the protective layer.

Each sample was allowed to stand still at temperature of 25°C. and a relative humidity of 20 % for 10 hours, and each of these unexposed samples was rubbed with rubber in a dark chamber under the same atmospheric conditions, Then, the samples were subjected to ordinary development treatment, and the state of formation of static marks was examined.

As a result, it was found that formation of static marks was very conspicuous in the sample containing no antistatic agent in the protective layer, but in all of 5 samples containing the antistatic agent in the protective layer no static mark was formed.

EXAMPLE 2

A silver iodo-bromide emulsion for color photo-graphy containing 4 mole % of silver iodide was sensitized at the second aging step. As the inner-type cyan coupler, 1-hydroxy-2N-[δ-(2,4-ditert-amylphenoxy)-butyl] naphthamide was dissolved under heating together with a stablilizer, a film-hardening agent, a coating agent and other additives into a mixed solvent of di-n-butyl phthalate and ethyl acetate, and the solution was emulsified and dispersed in a gelatin solution with use of sodium alkylbenzenesulfornate. The resulting dispersion was incorporated into the above emulsion, and the mixture was coated on a cellulose triacetate film and dried.

A gelatin solution containing a film-hardening agent and a coating agent was prepared and was divided into 8 portions. Compounds Nos. 1, 2, 7, 20, 28 and 34 and benzyl-dimethyl-tetradecyl ammonium chloride, as the comparative compound, were added to 7 portions, respectively. The former 6 compounds were added in an amount of 6 g per liter of the solution, and the comparative compound was added in an amount of 10 g per liter of the solution. The above 7 portions and the remaining one portion free of an antistatic agent were respectively coated on the layer of the above silver iodo-bromide emulsion for color photography, and dried to obtain samples.

Each of these samples was allowed to stand still at a temperature of 25°C. and a relative humidity of 20 % for 24 hours, and they were rubbed with a vinyl chloride rod in a dark chamber under the same atmospheric conditions and subjected to ordinary color development treatment to examine the state of formation of static marks.

As a result, it was found that in the sample incorporated with comparative compound in the protective layer and the sample free of an antistatic agent, formation of static marks was conspicuous, but in the samples having a protective layer incorporated with the compound of this invention no static mark was formed.

EXAMPLE 3

A gelatin aqueous solution containing Malachite Green as an antihalation dye and a coating agent was prepared, and the solution was divided into 5 portions. Compounds Nos. 4, 24, 26 and 32 were added respectively to the four portions respectively in an amount of 5 g per liter of the solution. Each of these 5 portions was coated as a backing layer on the back surface of a polyethylene terephthalate film on which the same silver iodo-bromide emulsion layer as used in Example 1 and an antistatic agent-free protective layer were formed, and the coated layer was dried.

Each of the so obtained samples was treated in the same manner as in Example 1 and the state of formation of static marks was examined.

As a result, it was found that in the sample having the backing layer incorporated with no antistatic agent formation of static marks was conspicuous but in samples having the protective layer incorporated with the compohnd of this invention no static mark was formed.

EXAMPLE 4

The same silver iodo-bromide emulsion as used in Example 1 was divided into 4 portions, and compounds Nos. 5, 23 and 42 were added as the antistatic agent to 3 divided portions, respectively, in an amount of 10 g per liter of the solution. These 3 samples and remaining one sample incorporated with no antistatic agent were coated and dried on a cellulose triacetate film.

These obtained samples were treated in the same manner as in Example 1 and the state of formation of static marks was examined.

As a result, it was found that formation of static marks was conspicuous in the sample containing no antistatic agent in the emulsion layer but in each of samples containing the compound of this invention in the emulsion layer no static mark was formed.

According to the method specified in JIS, these samples were light exposed and developed to determine the sensitivity and the fog. Photographic characteristics obtained in the four samples containing the compound of this invention were quite the same as those of the comparative sample free of the antistatic agent. Thus, it was found that addition of the antistatic agent of this invention had no bad influence on the photographic characteristics.

EXAMPLE 5

A high sensitivity gelatin emulsion of silver iodo-bromide containing 2 mole % silver iodide was gold-sensitized at the second aging step, and it was incorporated with a stabilizer, a sensitizing agent, a film-hardening agent, a coating agent and the like. The resulting emulsion was coated on a polyethylene terephthalate film and dried. A gelatin solution containing a film-hardening agent and a coating agent was coated on the above film as a protective layer and dried. The so obtained photosensitive was divided into 5 portions, and compounds Nos. 2, 10, 32 and 40 were coated in the form of a methanol solution to 4 portions, respectively, in an amount of 15 g per square meter of the sensitive film, and these portions were dried.

Each sample was treated in the same manner as in Example 1 and the state of formation of static marks was examined. As a result it was found that formation of static marks was conspicuous in the sample on which no antistatic agent was applied on the protective layer but no static mark was formed on the samples having the protective layer on which the antistatic agent of this invention was applied.

Four samples having the protective layer on which the antistatic agent of this invention was applied were allowed to stand still at a temperature of 55°C. and a relative humidity of 55 % for 10 hours, and they were rubbed with rubber in a dark chamber and then subjected to development treatment to examine the state of formation of static marks.

As a result, it was found that in samples containing compound No. 2 or 10 as the antistatic agent small number of static marks were formed but in samples containing compound No. 32 or 40 as the antistatic agent no static mark was formed.

What is claimed is:

1. Supported silver halide photosensitive material having an additive which comprises a glycidol poly-addition product of a phenol-aldehyde condensate or a glycidol poly-addition product of a halogenated phenol formalin condensate, the added glycidol being present in the amount of less than 50 moles per unit of said condensate.

2. A silver halide photosensitive material according to claim 1, wherein said additive is in at least one of the undercoat, intermediate, filter, antihalation, and protective and/photosensitive layers.

3. A silver halide photosensitive material according to claim 1, wherein said additive is in the outermost layer.

4. A silver halide photosensitive material according to claim 1, wherein said additive further comprises an ethylene oxide addition product of phenolaldehyde condensate or a nitrogen-containing quaternary salt.

* * * * *